(No Model.)

K. G. A. SONDÉN.
APPARATUS FOR DETERMINING THE REFRACTION OF LIQUIDS.

No. 454,989. Patented June 30, 1891.

Witnesses:
Theo. L. Popp
Emil Neuhart

K. G. A. Sondén Inventor.
By Wilhelm Bouner
Attorneys.

UNITED STATES PATENT OFFICE.

KLAS GUSTAF ANDERS SONDÉN, OF STOCKHOLM, SWEDEN, ASSIGNOR TO JOHN BERNSTRÖM, OF SAME PLACE.

APPARATUS FOR DETERMINING THE REFRACTION OF LIQUIDS.

SPECIFICATION forming part of Letters Patent No. 454,989, dated June 30, 1891.

Application filed October 21, 1890. Serial No. 368,775. (No model.)

*To all whom it may concern:*

Be it known that I, KLAS GUSTAF ANDERS SONDÉN, a subject of the King of Sweden and a resident of Stockholm, in the Kingdom of Sweden, have invented a new and useful Improvement in a Method of and Apparatus for Testing Liquids, of which the following is a specification.

This invention relates to a method of and an apparatus for testing liquids by comparing their refractive powers.

The invention is designed more particularly for detecting the adulteration of butter, but may be used for testing various liquids, and also fats which can be liquefied by heat.

Figure 1:
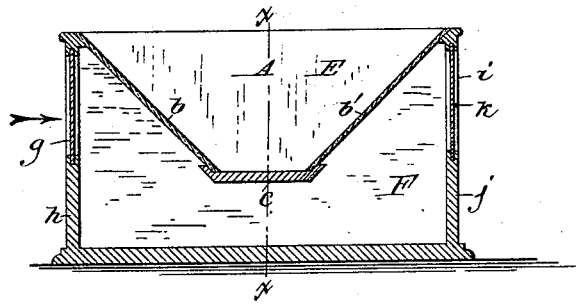
Figure 2:
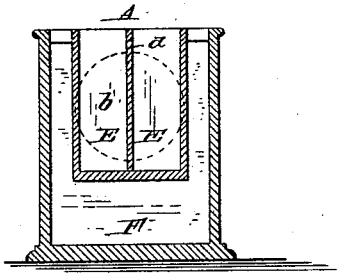
Figure 3:
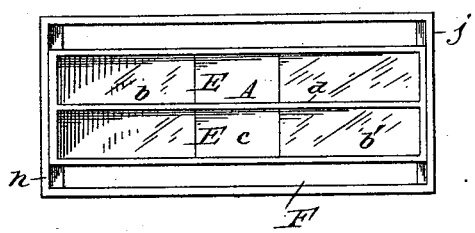
Figure 4:
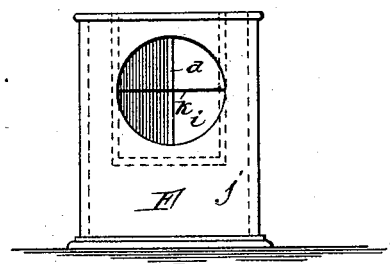
Figure 5:
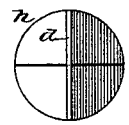
Figure 6:
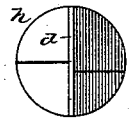
Figure 7:
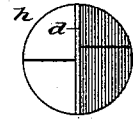

In the accompanying drawings, Figure 1 is a longitudinal sectional elevation of the apparatus. Fig. 2 is a cross-section in line $x\,x$, Fig. 1. Fig. 3 is a top plan view of the apparatus. Fig. 4 is an end elevation thereof. Figs. 5, 6, and 7 are views of the parts which are visible through the eye-opening.

Like letters of reference refer to like parts in the several figures.

A represents a prismatic vessel open at the top and having transparent inclined front and rear walls $b\,b'$, which are secured with their lower ends to a bottom $c$. The prismatic vessel is divided by a longitudinal partition $d$ into two chambers E E, which are arranged side by side. One of these chambers receives the liquid to be tested and the other chamber the normal liquid with which the liquid to be tested is compared.

F represents an inclosing vessel open at the top, into which the prismatic vessel is placed, so that the inclined walls and the bottom of the prismatic vessel are immersed in a transparent liquid placed in the inclosing vessel. The front and rear ends of the prismatic vessel rest upon the front and rear walls of the inclosing vessel, so that the prismatic vessel can be readily applied to the inclosing vessel or be removed therefrom. $g$ represents an eye-opening formed in the front wall $h$ of the inclosing vessel opposite the inclined front wall $b$ of the prismatic vessel, and $i$ is a similar opening formed in the rear wall $j$ of the inclosing vessel. These openings are covered with plates of glass or other transparent material. A straight line or mark $k$ is arranged horizontally and diametrically across the glass plate of the rear opening $i$.

The normal liquid of a known degree of purity is placed in one of the chambers E, and the liquid to be tested is placed in the other chamber. By observing the line $k$ through the eye-opening $g$ and the liquids in the prismatic chambers the refractive powers of the two liquids are readily compared. When both liquids have the same refractive powers, the line will appear straight, as represented in Fig. 5. When the refractive powers of the two liquids are different, the line will appear broken, the part which is visible through one liquid being above or below the part which is visible through the other liquid, as represented in Figs. 6 and 7. This broken appearance of the line indicates a difference in the composition of the liquids.

When fatty matters are to be examined which can be liquefied by heat, the inclosing vessel is filled with hot water, whereby the fats are melted. When more than two liquids are to be compared simultaneously, the number of chambers is correspondingly increased.

The form of the apparatus can be varied in many ways without departing from my invention, so long as the transparent prismatic chambers are retained.

I claim as my invention—

1. The herein-described method of testing liquids, which consists in comparing their refractive powers by placing the liquids to be compared separately in transparent prismatic chambers side by side and observing the refraction of a mark through the liquids, substantially as set forth.

2. An apparatus for comparing the refracting powers of liquids, consisting of a hollow prismatic chamber having transparent front and rear walls arranged at an angle to each other and divided into parallel compartments, each holding a liquid separately, whereby a mark arranged across the rear wall can be viewed simultaneously through the liquids in the compartments, substantially as set forth.

3. An apparatus for comparing the refracting powers of liquids, consisting of a hollow prismatic chamber open at the top and having inclined transparent front and rear walls and a division-wall extending from the front to the rear wall and dividing the chamber into separate compartments, substantially as set forth.

4. The combination, with transparent prismatic chambers arranged side by side, of an inclosing vessel adapted to receive a heated liquid and provided with an eye-opening opposite the front wall of the prismatic chambers, and a transverse line or mark opposite the rear wall of the prismatic chambers, substantially as set forth.

Witness my hand this 2d day of October, 1890.

KLAS GUSTAF ANDERS SONDÉN.

Witnesses:
E. H. CAASE,
ERNST EKSTROM.